(12) United States Patent
Britt

(10) Patent No.: X5606
(45) Date of Patent: Aug. 10, 1829

(54) SHEARING CLOTH, SHEARS FOR

(76) Inventor: Samuel A. Britt

Samuel A. Britt
Letters Patent

The Schedule referred to in these Letters Patent and making part of the same containing a description in the words of the said Samuel A. Britt himself of his improvement in the shears of a cloth shearing machine —————— fo First; A revolving cylinder of three feet or more in length three & one fourth inches in diameter on which are placed four blades of steel ground bevelling five eighths of an inch in width & one fourth of an inch in thickness fastened on springs & curved to a quarter of a circle laying flatways) confined by screws to the springs resting on the cylinder, three at each blade cylinding one third round the cylinder, with a set screw back of the blade thro' the spring into the cylinder for the purpose of gauging the blades —

The cylinder when put in motion, the blades come in contact with a bed blade, laying horizontal operating as tailors shears in its cutting: The cloth is gauged to this bed blade as it passes the shears by an iron rest or gauge which is 3/4 of an inch thick on the back and bevel to an edge of 1/8 of an inch at two inches wide governed by screws and attached to any shearing machine now in use Witness
Justin Swindle
C. C. Baker Samuel A Britt Ctd W.H.

(230 words)

United States Patent
Patent No.: X5606
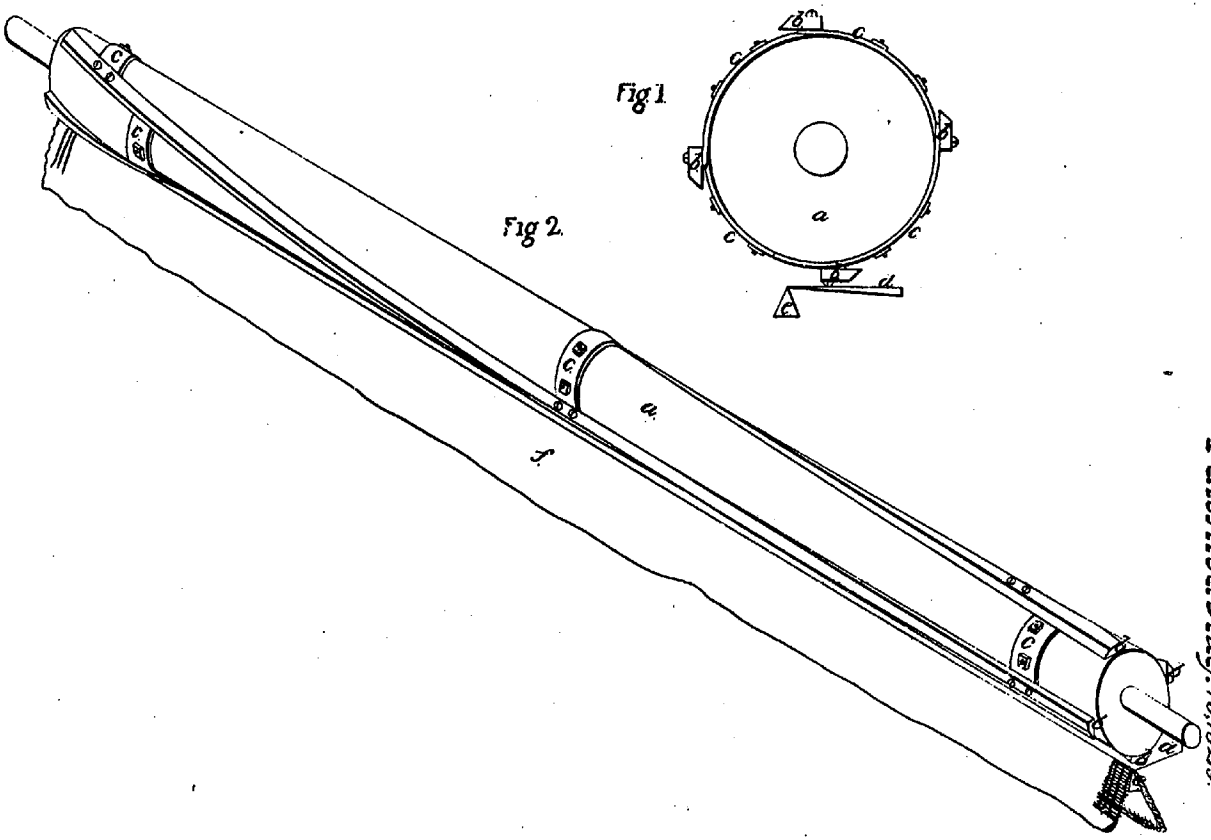
N. PETERS, PHOTO-LITHOGRAPHER, WASHINGTON D. C.